Figure 1:
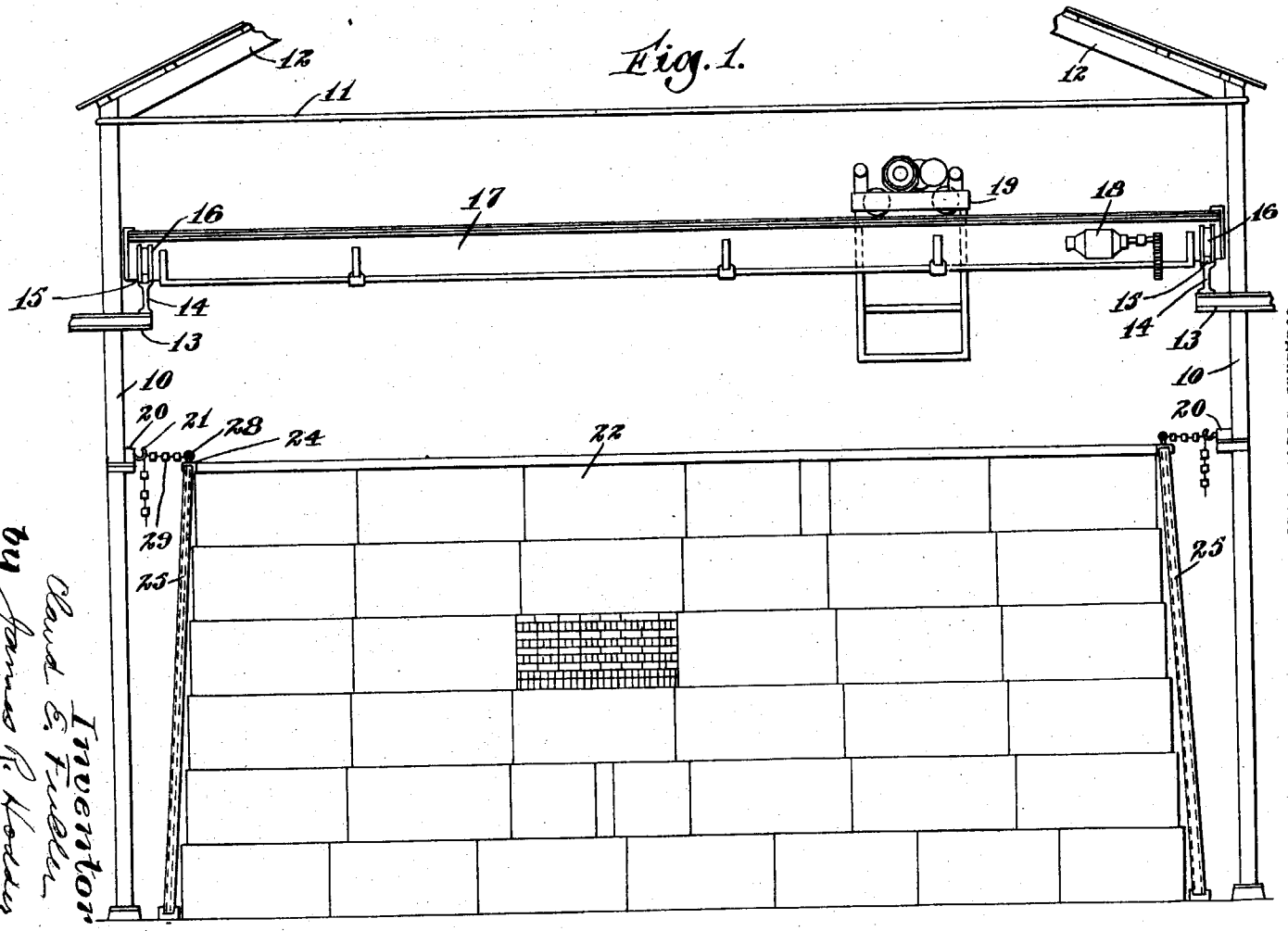

May 24, 1927.

C. E. FULLER

Re. 16,634

PORTABLE SCOVING

Original Filed April 21, 1924 2 Sheets-Sheet 1

Inventor
Claud E. Fuller
by James R. Hodder
attorney

May 24, 1927. Re. 16,634

C. E. FULLER

PORTABLE SCOVING

Original Filed April 21, 1924 2 Sheets-Sheet 2

Inventor
Claud E. Fuller
by James R. Hodder
Attorney

Reissued May 24, 1927. Re. 16,634

UNITED STATES PATENT OFFICE.

CLAUD E. FULLER, OF NEW YORK, N. Y., ASSIGNOR TO NEW YORK BRICK HANDLING CORPORATION, OF NEW YORK, N. Y., A CORPORATION OF NEW YORK.

PORTABLE SCOVING.

Original No. 1,548,794, dated August 4, 1925, Serial No. 707,856, filed April 21, 1924. Application for reissue filed March 8, 1927. Serial No. 173,730.

My present invention relates to scoving, and more particularly to an improved form of portable scoving for brick kilns and the like.

As is well known, in a brick kiln it is necessary to protect the sides of the kiln by a scoving which may be either built onto the sides of the kiln or a portable scoving used, the idea being to economize fuel and obtain a more even heat during the burning process. What may be called permanent scoving is expensive to manufacture and results in a great many ruined brick because of the material of the scoving adhering to the same during the burning process. Portable scoving as at present utilized is also unsatisfactory because of the difficulties of handling the same and the liability to breakage and warping because of the intense heat to which it is subjected and no satisfactory means has heretofore been devised for obviating the results of cracking or warping. Further, in portable scoving as at present utilized, there is no satisfactory way of inserting therein the usual and commercial form of kiln door.

In my present invention, I have obviated the objections to portable scoving as heretofore made and have provided a novel form of portable scoving which may be easily and readily handled by the ordinary conveyor mechanism found in a brick kiln and in which any cracking due to expansion, contraction, or handling of the material can be taken up. Further, in my new and improved form of scoving the usual and commercial type of kiln doors may be built in and when so built in, form a part of the scoving itself and may be handled with such scoving. Also, by my improved invention I am enabled to hold a section or sections of scoving in an upright position while the kiln is being emptied and in a predetermined slope while the kiln is being filled and thereafter releasing the scoving so that the weight of the scoving will act to hold the brick in place and close up the space occasioned by the shrinking of the brick during the process of burning.

In carrying out my improved invention I arrange channel irons at the top and bottom of the scoving which is built up from insulating and fire-resisting material and arrange a plurality of rods that run entirely through the insulating and fire-resisting material and such rods co-operate with the channel irons at the top and bottom of the sections of scoving whereby the rods, when placed under tension, will take up any cracking caused by the expansion and contraction of the material or the handling of the scoving.

Heretofore where it has been attempted to utilize portable scoving, it has been necessary to provide a long steel fork which was attached to the crane, and which fork was adapted to be inserted underneath the slab of scoving when moving the same, and in order to keep the slab of scoving lying properly in the forks it was necessary to have it so hung that the slab was lying at an angle in the forks. This necessity for inclining the slab of scoving rendered it impossible to accurately position the slab with respect to the kiln and also rendered necessary a considerable amount of room between the stacks of bricks and the posts of the kiln building. I have obviated this objection in my present structure and have provided means secured to the top of the slab of scoving, such means being adapted for attachment to the crane hooks. I am enabled, by this improved structure, to manipulate the scoving in the minimum amount of room which is of material advantage in allowing the fullest use of the kiln building in building the kiln. By this method of handling the scoving I am also enabled to fix the slope of the scoving with respect to the yet unbuilt kiln, the slope given to the scoving governing the settling of the brick in the kiln, and after the kiln is built, I utilize means associated with the scoving so that such scoving will follow the brick during the process of burning the same and prevent the openings which would otherwise occur.

The principal object of my invention, therefore, is an improved and novel form of portable scoving for brick kilns and the like.

Another object of my invention is a portable scoving section having as an integral part thereof and inset therein the commercial type of kiln door.

A further object of my invention is an improved and novel means for taking up any cracking due to expansion and contraction or handling or warping of the scoving section.

Figure 2:
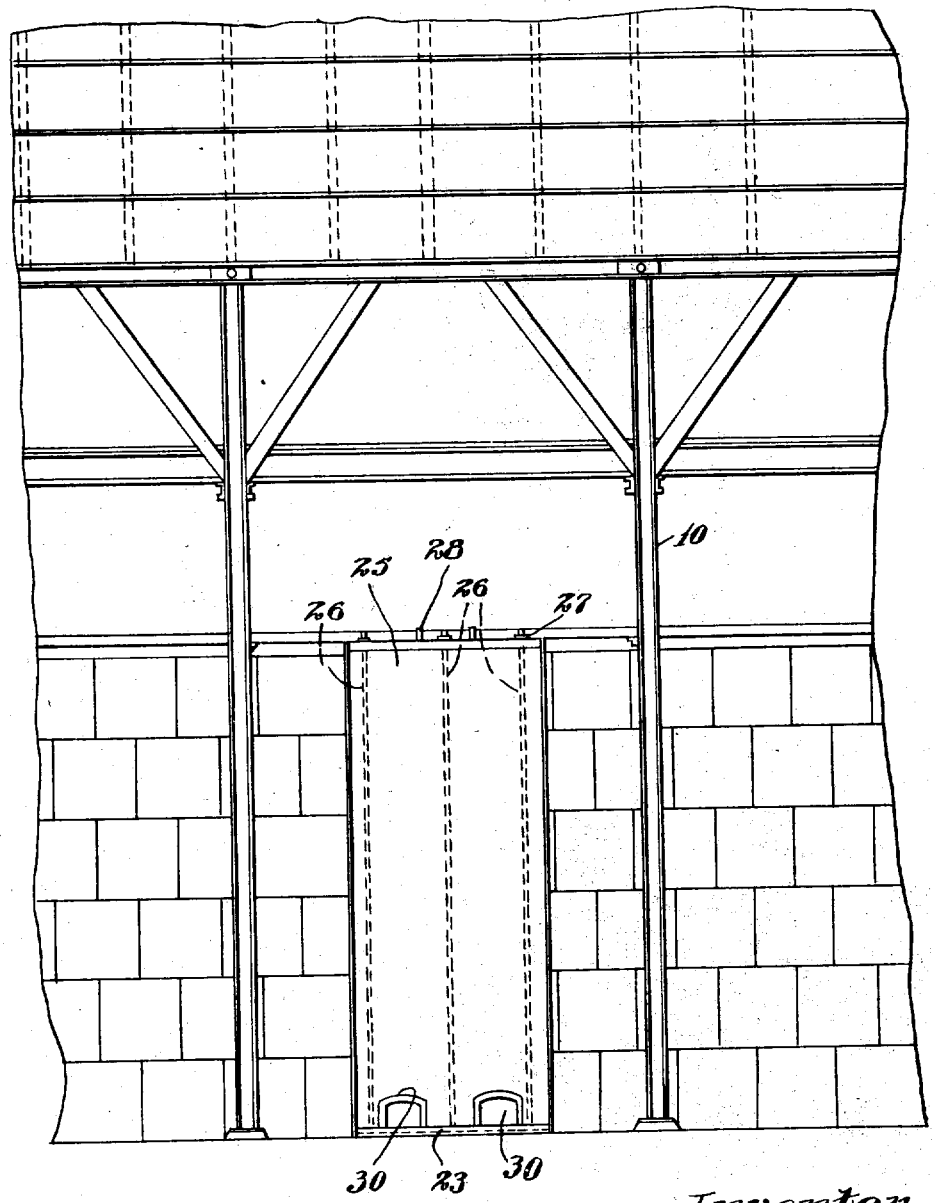

In the accompanying drawings illustrating a preferred embodiment of my invention as located in a kiln, Fig. 1 is a sectional elevation through a shed showing a kiln in elevation and with my improved scoving in position with respect to such kiln, and Fig. 2 is a side elevation of Fig. 1 showing in front elevation a section of scoving having positioned as an integral part thereof of the commercial type of kiln.

Referring to the drawings, the shed is constructed in the usual manner of a plurality of uprights 10 spaced apart from each other and tied together at their top by tie rods or beams 11, a roof 12 being built at the upper end of the uprights 10. At any convenient height above the ground level and attached to the uprights 10 are supports 13 on the upper end of which rest and are secured eye beams 14 running parallel to the length of the shed as is usual. Secured to the top of the beams 14 are rails 15 arranged parallel to each other and constituting tracks on which run wheels 16 rotatably mounted on, and supporting, the traveling crane beams 17. Means are provided, as indicated by the numeral 18, for causing a rotary movement of the wheels 16 and therefore a movement of the crane beams 17 along the length of the building while a traveling carriage 19 is arranged with suitable means whereby an operator may control the crane mechanism. The above structure with regard to the crane is the usual structure and is well understood and a detailed description thereof appears to be unnecessary. Between the ground level and the supporting beams 13 and secured to the uprights 10 are beams 20 provided at intervals with hooks 21 that extend inwardly toward the interior of the shed for a purpose to be hereinafter described.

As is usual, the kiln is built up of a plurality of stacks of bricks 22 arranged in hacked relation in the usual manner, the kiln occupying the major portion of the floor space of the kiln, but leaving along each side wall, as defined by the posts 10, a passage for the workmen. In place of the usual scoving I arrange sections of portable scoving, said sections being constructed by placing the channel iron 23 at the bottom and a channel iron 24 at the top arranged parallel to each other and of any suitable length. If the section of scoving is not to be a section through which the kiln may be fired, there is provided a slab 25 composed of insulating and fire-resisting material and in the manufacture of such section of scoving it is desirable to employ a form of mold. Extending entirely through the slab of material 25 are rods 26 of any suitable or desired number, these rods being secured at their lower end to the channel iron 23 and their other end extends through perforations (not shown) in the channel iron 24 and the extended ends of such rods 26 are threaded to receive nuts 27 and by means of which the channel irons 23 and 24 are forced firmly into engagement with the top and bottom ends of the slab 25. As shown in Fig. 2, I have arranged three rods 26 in the slab 25, but the number may be varied as desired without departing from the spirit of the invention. Secured to the top channel member 25 are eyes 28 and the number of such eyes may be any number desired, though I have found two to be ample. Secured to each of the eyes 28 is one end of a chain 29, which chain may be attached to the hooks 21, above referred to, and which chain, as will be seen from an inspection of Fig. 1, prevents a too far inward movement of the upper end of the section of scoving toward the kiln.

Where the section of scoving is to be located around the kiln at a point where it is desired to fire the kiln, kiln doors 30 are arranged on the lower channel iron 23 and the slab of material 25 is molded around the same, thus securely fastening them in position.

In utilizing my improved sections of scoving, the kiln is built in the usual manner and the crane operator, by manipulating the crane, hooks onto the eyes 28 and transports the sections of scoving to any desired position around the kiln, as shown, for example, in the drawings, and, assuming it to be the ordinary section of scoving, it is placed with relation to the kiln with the channel iron 23 closely adjacent to the bottom of the stack or unit 20 and inward movement of the upper end of the section of scoving is predetermined and limited by the use of the chain 29 in connection with the hooks 21. The kiln is now built up in the usual manner of a plurality of stacks or units and, when the kiln is completely built, it is entirely surrounded by the sections of scoving. The chains 29 may now be released from the hooks 21 so that the weight of the sections of scoving rests on the kiln and the tops of such sections of scoving will move inward toward the center of the kiln as the bricks forming the stacks or units 22 shrink during the burning operation. After the brick have been entirely burned, the tops of the sections of scoving may be moved toward the line of posts 10 and held thereagainst by means of the chains 29 and hook 21 or may be moved to any portion of the shed desired by the use of the traveling crane.

While I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

1. An improved portable scoving comprising a slab of insulating and fire-resisting material of suitable thickness and means for placing the material of the slab under compression.

2. An improved portable scoving for brick kilns and the like comprising a slab of insulating and fire-resisting material, a metallic member arranged at each end thereof, tie rods extending through the slab of material and metallic members, and means associated with said tie rods for forcing the metallic members toward each other whereby the slab of material between such metallic members is compressed and any cracks appearing in the slab from contraction and expansion or handling are taken up.

3. An improved portable scoving comprising a slab of insulating and fire-resisting material, channel irons arranged at the top and bottom of such slab of material, a kiln door resting on the bottom channel iron and fitting into and through the slab of insulating or fire-resisting material, a plurality of tie rods extending through the slab of material, and means for placing said rods under tension whereby the channel irons are forced toward each other to thereby compress the material of the slab to take up cracks in the material.

4. That improved method of utilizing portable scoving in connection with the building of kilns and the burning of the brick therein which consists in setting the portable scoving at a predetermined slope to govern the setting of the brick in the kiln, securing such scoving in such predetermined position during the building of the kiln and then releasing the scoving whereby such scoving will follow the brick during the process of burning to prevent openings in the kiln.

5. An improved portable scoving comprising a slab of insulating and fire-resisting material of suitable thickness, means for placing the material of the slab under compression, and operating rings secured to the top edge of such slab.

6. An improved portable scoving for brick kilns and the like, comprising a rectangular frame, bars extending longitudinally thereof, and a layer of fire-resisting material built into the rectangular frame and associated with said bars.

7. An improved portable scoving for brick kilns and the like, comprising an open rectangular frame, a plurality of parallelly arranged rods secured thereto, and a layer of fire-resisting and insulating material built into the open rectangular frame and supported by the parallelly arranged rods.

8. An improved portable scoving for brick kilns and the like comprising a reinforcement and a layer of fire resisting material consisting of a single integral slab.

In testimony whereof, I have signed my name to this specification.

CLAUD E. FULLER.